United States Patent [19]

Kai et al.

[11] 4,215,153
[45] Jul. 29, 1980

[54] METHOD FOR THE PRODUCTION OF FISH MEAT POWDER RETAINING FUNCTIONAL CHARACTERISTICS OF FRESH FISH MEAT

[75] Inventors: Fumindo Kai, Tachikawa; Eitaro Kumazawa, Sayama; Yozo Ishioka, Higashikurume; Kazuyoshi Ishida, Kawagoe, all of Japan

[73] Assignee: Snow Brand Milk Products Co., Ltd, Sapporo, Japan

[21] Appl. No.: 892,012

[22] Filed: Mar. 31, 1978

Related U.S. Application Data

[63] Continuation-in-part of Ser. No. 716,561, Aug. 23, 1976, abandoned.

[51] Int. Cl.$^2$ .............................................. A22C 25/00
[52] U.S. Cl. ..................................... 426/643; 426/470
[58] Field of Search ................ 716/561; 426/573, 574, 426/583, 641, 643, 470, 471

[56] References Cited

U.S. PATENT DOCUMENTS

| | | | |
|---|---|---|---|
| 3,031,312 | 4/1962 | Morgan et al. | 426/470 |
| 3,093,488 | 6/1963 | Graham et al. | 426/470 |
| 3,922,372 | 11/1975 | Hasegawa | 426/574 |
| 3,955,011 | 5/1976 | Niki et al. | 426/643 |
| 3,959,517 | 5/1976 | Niki et al. | 426/643 |

*Primary Examiner*—Robert A. Yoncoskie
*Attorney, Agent, or Firm*—Stevens, Davis, Miller & Mosher

[57] ABSTRACT

A fish meat powder retaining the functional characteristics of fresh fish meat is obtained by mincing and kneading fresh meat or frozen SURIMI (frozen ground fish meat), then subjecting the minced and kneaded meat to a colloid mill treatment to form a sol, foaming the resultant fish meat sol in a vacuum and drying the fish meat foam to form a thin sheet at low temperatures.

12 Claims, No Drawings

METHOD FOR THE PRODUCTION OF FISH MEAT POWDER RETAINING FUNCTIONAL CHARACTERISTICS OF FRESH FISH MEAT

CROSS-REFERENCE TO RELATED APPLICATION

The present application is a continuation-in-part of application Ser. No. 761,561, filed Aug. 23, 1976, and now abandoned, and entitled METHOD FOR THE PRODUCTION OF FISH MEAT POWDER RETAINING FUNCTIONAL CHARACTERISTICS OF FRESH FISH MEAT.

FIELD OF THE INVENTION

This invention relates to a method for converting a fresh fish meat or frozen SURIMI starting material into a fish meat powder which retains the functional characteristics of the starting material. The term "fresh fish meat" as used herein refers to a product containing at least 50% by weight (on basis of solid matter) of undenatured myofibril proteins and retaining ATPase activity. Also, the term "frozen SURIMI" as used herein refers to a product obtained by freezing a fresh fish meat mentioned above with a polyphosphate, sorbitol and/or sugar, etc. (refer to U.S. Pat. No. 3,955,011).

BACKGROUND OF THE INVENTION

In recent years, as a consequence of an increase in the demand for fish meat as the source of proteins, a need has been felt for establishment of a method which permits fish meat stock to be preserved in the state having the functional characteristics of fresh fish meat retained intact for a long period of time.

For the purpose of such preservation, a method has previously been used which comprises the steps of slicing meat from the fish body, washing the meat slices with water, grinding the washed meat slices with a polyphosphate and a saccharide or sugar alcohol and freezing the resultant ground meat mixture to produce frozen SURIMI. This method is effective in preventing the fish meat from losing the functional characteristics of fresh fish meat during the frozen storage and in preventing the fish meat from degradation by freezing. Nevertheless this method requires that the fish meat be stored in a frozen state and, therefore, entails the disadvantage that the expense for freezing the fish meat and the expense for frozen storage of fish meat in the phase of distribution in the market are great.

As a result, with a view toward ensuring simple handling during market of distribution, there has recently been proposed a method for producing a fish meat powder retaining the functional characteristics of the fresh fish meat used as the raw material by preparing fresh fish meat or frozen SURIMI in the form of a sol and subsequently spray drying the fish meat sol. According to this method, however, the fish meat being prepared in the form of sol must be diluted with added water to a solids content (about 10 percent) so as to facilitate spray drying. The addition of extra water brings about the disadvantage of an additional energy requirement for the dehydration of fish meat by spray drying.

For the drying of foodstuffs, there are generally employed means such as spray drying, freez-drying and vacuum drying, depending on the attributes and forms of the particular foodstuffs. In the case of fish meat, because of the peculiar properties of fish meat such as, for example, high susceptibility of fish meat proteins to denaturation and the high molecular weights of the fish meat proteins compared with those of other foodstuffs, it is considered extremely difficult from the practical point of view to have the fish meat dried in such a way that the functional characteristics of fresh fish meat will be retained intact throughout the drying treatment. When a fish meat powder retaining the aforementioned characteristics is to be produced by use of the freeze-drying process which entails less denaturation of fish meat proteins, for example, the frozen fish meat raw material is subjected to heat drying under vacuum. Thus, this process has the disadvantage of energy requirements in the two separate steps of freezing and drying. Furthermore, since this process is carried out batch-wise, the production efficiency thereof is too low to render the possible practicable.

Although U.S. Pat. No. 3,093,488 (Graham et al.) discloses a process of preparing a porous dehydrated fish meat product by gasifying a fish meat sol, forming it into a stable foam and dehydrating the foam, it has been found as shown in the "Comparative Example" described hereinafter that a fish meat powder cannot be produced by the Graham process which retains the functional characteristics of fresh fish meat.

SUMMARY OF THE INVENTION

In view of the above, we made a study in search of a method for the production of a fish meat powder retaining the functional characteristics of the starting material, which method does not require any large energy cost for drying and can be practiced in a continuous operation. We have consequently discovered a method which includes (a) mincing and kneading fresh fish meat (raw fish slices) or frozen SURIMI, as referred to above, as the raw material at a temperature of not more than 30° C.; (b) subsequently milling the minced and kneaded meat with a colloid mill at a similar temperature in such way as to produce a fish meat sol having fine air bubbles uniformly distributed therein; (c) then abruptly foaming the fish meat sol under a fixed degree of vacuum to convert the sol into a porous mass; and (d) finally drying the porous mass at a temperature of not more than 30° C. The energy cost required for the final drying in this method is very low, the drying operation can be accomplished in a continuous manner at a rapid rate and the aforementioned functional characteristics are retained in the final product because the conversion of fish meat as the raw material into the sol is effected without the addition of water.

DETAILED DESCRIPTION OF THE INVENTION

This fish meat which is used as the raw material in the present invention is the raw SURIMI or frozen SURIMI of slices obtained from any white-meat fish which has a comparatively low oil content and contains at least 50% by weight of undenatured myofibril proteins and retains ATPase activity, i.e., has an ability to form KAMABOKO (boiled fish meat cake). The term "undenatured myofibril proteins" refers to the myofibril proteins as contained in raw fresh fish meat, i.e., raw myofibril proteins. Examples of fish which satisfy this requirement and are suitable for this purpose include Alaska pollack, komai, flatfish, warazuka, lockington, saurida, nibea mitsukuria, merluza, halibut and tilapia. The fish meat to be used as the raw material must be as fresh as permissible, for the KAMABOKO-forming property of fish meat increases with increasing degree of freshness of the fish meat. The term "functional characteristics of fresh fish meat" as used herein shall mean the KAMABOKO-forming property which is predominantly characterized by its binding ability, along with the water-holding property representative of the affinity for water and other similar properties which are inherently possessed by fresh fish meat. These functional characteristics are very important from the standpoint of the usefulness of fish meat in food processing. The functional characteristics degrade in proportion as the denaturation of fish meat proteins advances, that is, as the content of undenatured myofibril proteins lowers and ATPase activity falls. For this reason, the present invention, like others, prefers incorporation into the fish meat of saccharides such as sucrose, glucose, maltose and lactose and/or sugar alcohols such as sorbitol, xylitol and mannitol which are substances which prevent denaturation of proteins due to dehydration. Where frozen SURIMI is used as the raw material, however, the incorporation of additives is not specially required because frozen SURIMI usually incorporates from the beginning such substances in conjunction with polyphosphates to serve as agents for prevention of denaturation due to freezing.

In the present invention, the fish meat satisfying the aforementioned requirements for raw material is minced by use of a silent cutter and kneaded by use of a kneading machine such as a meat chopper and subsequently subjected to the colloid mill treatment while the meat temperature is held at a temperature of not more than 30° C. so as to form a fish meat sol having fine air bubbles uniformly contained therein. Addition to the fish meat of a soluble polysaccharide such as dextrin, a soluble protein such as whey protein or egg white, a natural gum such as tragacanth gum or a synthetic stabilizer such as carboxymethyl cellulose (CMC), preparatory to the formation of the fish meat sol, stabilizes the fine air bubbles in the resultant meat sol. Further, the aforementioned treatment of mincing, kneading and colloid milling is preferred to be carried out quickly at low temperatures in the range of from 0° to 5° C. where the meat is precluded from freezing. All precautions should be exercised to keep the meat temperature below 30° C., for if the meat temperature is allowed to rise above 30° C., there is a possibility that myofibril proteins in the fish meat will undergo denaturation and ATPase activity in the fish meat will fall in the course of the treatment and consequently the functional characteristics which the finally produced fish meat powder is expected to retain will be impaired. Moreover the treatment of milling with a colloid mill is preferably carried out in such way that the kneaded fish meat is fed in the form of lump little by little into the colloid mill under an atmospheric or a gaseous environment, preferably an inert gaseous environment, to afford a fish meat sol having fine air bubbles uniformly and stably distributed therein.

The formation of the fish meat sol having fine air bubbles uniformly distributed therein as contemplated by the present invention may satisfactorily be carried out by mincing, kneading the fish meat as the raw material in a kneading machine such as a meat chopper and subsequently subjecting the kneaded meat to the colloid mill treatment at a rate of about 2200 rpm. Once the fish meat sol having fine air bubbles uniformly distributed therein is formed, as described above, the subsequent foaming by the treatment under a vacuum and the following drying can be carried out very effectively. The fish meat sol which is obtained by the aforementioned treatment of mincing, kneading and colloid milling offers no hindrance to drying because the viscosity of the sol is below about 2,000 poise. Especially, the treatment of kneading followed by the colloid mill treatment is essentially important for obtaining a fish meat sol having fine air bubbles uniformly contained therein. The method of the present invention, therefore, proves to be advantageous over the conventional methods which rely for the production of fish meat powder upon the known technique of spray drying.

In the present invention, the fish meat sol obtained as described above is quickly foamed under a vacuum, preferably a vacuum in the range of from 4.6 to 30 Torr, to give rise to a spongy mass having a foamed texture. Subsequently, the spongy mass is spread in the form of a thin sheet on a surface such as a drying belt (made of steel) and the thin sheet is dried such as by means of radiant heat or heat conducted through the medium of the belt or by combination of these two means of heat application. If in this case, the fish meat sol is kept under a vacuum of less than 4.6 Torr, there is a possibility that the sol will be frozen. If it is kept under a vacuum of more than 30 Torr, however, the temperature of the sol will rise and consequently the functional characteristics of fresh fish meat will be degraded and the stability of the cells in the foamed mass impaired to the extent of allowing the solid to return to a liquid state. Use of a degree of vacuum outside the specified range, therefore, proves to be disadvantageous. If the drying treatment is performed on a fish meat sol which has assumed a liquid state, then a dry film is formed on the surface of the sol which impedes the movement of water inside resulting in hindering vaporization of the water, therefore, even if the interior of the system is kept under a low degree of vacuum, the temperature of the material being treated rises in the course of the drying treatment by heating, with the result that the functional characteristics will be degraded.

When the fish meat sol is foamed to produce a spongy texture and then subjected to drying as described above, the water present in the sol becomes readily diffusible in conjunction with the air bubbles and, at the same time, the area of vaporization increases remarkably because the texture is porous. Consequently, the drying can be rapidly accomplished even by a small change of temperature gradient. According to the present invention, therefore, the drying of the fish meat sol can be accomplished while the temperature of the sol is held below 30° C., the highest temperature that permits prevention of denaturation of the myofibril proteins and depreciation of the ATPase activity. By the drying described above, the water content of the finally produced fish meat powder can be decreased to below 6 percent. In connection with the drying, since the present invention effects the conversion of the fish meat raw material into the sol without necessarily requiring addition of water, the concentration of solids in the resultant sol is in the neighborhood of 20 percent even when the raw material is in the form of fish meat slices. In the drying according to this invention, therefore, the energy cost required in obtaining the fish meat powder having a water content of not more than 6 percent is notably small as compared with the treatment effected by means of spray drying (in which case the solids content of the sol must be lowered to the neighborhood of 10 percent).

The fish meat powder which is obtained in consequence of the drying treatment effected as described above is immediately packed airtightly by a vacuum packaging system and stored at low temperatures of the order of 0° to 10° C.

As illustrated in one of the preferred embodiments described hereinafter, a test specimen was prepared by (a) causing a fish meat powder obtained in accordance with the present invention to be kneaded in conjunction with a suitable amount of water and about 3 percent of sodium chloride, (b) subjecting the resultant mix to finishing kneading in conjunction with added starch, and (c) heating the final mix by following the procedure employed in the production of KAMABOKO with necessary modifications. The specimen was tested and found to have a jelly strength of about 680 g, a value comparable with the jelly strength of a test specimen prepared by subjecting raw SURIMI from fresh fish meat to the same treatment. This indicates that the fish meat powder has the jelly strength (namely, the KAMABOKO forming property) and the water-holding property (namely, the ability to reconstitute with addition of water) which are exhibited by fresh fish meat.

As described above, the present invention enables a fish meat powder retaining the functional characteristics of fish meat as the raw material, namely, the KAMABOKO-forming ability and the water-holding property to be obtained with great advantage.

Now, the present invention will be described with reference to preferred embodiments herein below. These examples should not be considered as limiting the present invention.

EXAMPLE 1

100 kg of raw sliced meat of pollack was washed in advance with water and then mixed with 2.5 kg of surcose. The meat contained 70% by weight of undenatured myofibril proteins and retained 260 μmol p/min/g solid matter of ATPase activity. The mix was cooled to a temperature of 0° to 5° C. and then minced by use of a silent cutter and kneaded by use of a meat chopper and subsequently converted under an atmospheric environment into a sol in a colloid mill operated at a rate of 2,200 to 2,300 rpm while feeding it in the form of lump little by little thereinto and simultaneously cooling it so as to keep the meat temperature from rising above 30° C. The resultant sol was confirmed to have fine air bubbles uniformly distributed throughout.

The sol was continuously delivered, as soon as it was formed, to a vacuum drier, the interior of which was maintained under a vacuum of 5 to 6 Torr and the sol was spread to a uniform thickness on a belt disposed inside the drier housing. The belt was kept at a temperature below the temperature of the sol (not more than 30° C.). The sol spread on the belt rapidly foamed under vacuum and assumed a spongy state. The belt was moved so that the unit heaters (disposed one above and the other below the plane of the belt at a suitable point with reference to the path of the belt) heated the spread sol, with the heaters controlled so as to keep the temperature of sol below 30° C. This controlled heating was carried out by graduating the temperature of the unit heaters; first at 180° to 220° C. for one minute, then at 130° to 170° C. for three minutes, at 90° to 110° C. for five minutes and finally at 30° to 50° C. for seven minutes. The fish meat powder was consequently obtained by this drying treatment had a water content of 3.4%.

The fish meat powder thus obtained was mixed with water in an amount required to adjust its solids content to the neighborhood of 25 percent similar to that of the fish meat used as the raw material and kneaded in the presence of the added water for ten minutes. Subsequently, the resultant mix was kneaded for ten minutes in the presence of 2.5 percent by weight of sodium chloride. It was then subjected to finishing kneading with 5 percent by weight of starch for ten minutes in a vacuum grinder. The finally produced mix was immediately placed in a casing, heated at 85° C. for 30 minutes for gelation, cooled, then held at 5° C. for 48 hours and thereafter tested for jelly strength. For the purpose of comparison, raw SURIMI was subjected to heat treatment by repeating the procedure described above, except for omission of water addition. The finally produced mix was cooled and thereafter tested for jelly strength. The results were as shown below.

|  | Jelly strength (g) |
|---|---|
| Test specimen obtained by Example 1 | 700 |
| Test specimen obtained from raw SURIMI | 763 |

The measurement of the jelly strength was made by use of Okada type jelly strength meter and steel balls 5 mm in diameter.

The gelled mix obtained by the aforementioned steps of heating and cooling was molded into a sheet 3 mm in thickness, folded into four piles and subjected to a bending test. In the test, substantially no cracks were formed. (The bending strength is rated as the highest AA grade according to the standard used in the trade.)

Furthermore, each of the above gelled mixes was tested by a texturometer (General Foods Corp., U.S.A.). The results were as shown below.

|  | Hardness | Elasticity |
|---|---|---|
| Test specimen of Example 1 | 4.61 | 11.5 |
| Test specimen from raw SURIMI | 4.8 | 9.0 |

EXAMPLE 2

An unsalted frozen SURIMI (having a solids content of 25 percent), which contained 69% by weight of undenatured myofibril proteins and retained 240 μmol p/min/g solid matter of ATPase activity, obtained by freezing raw pollack as used in Example 1 according to an ordinary procedure, was defrosted at low temperature and sliced with the meat temperature held in the range of 0° to 5° C. The slices of meat were converted into a sol by the same procedure as described in Example 1 and cooled so as to keep the temperature of meat below 30° C. The mix was treated by repeating the procedure of Example 1, to afford a fish meat powder.

The fish meat powder was added by an amount of water required for the solids content thereof to reach the neighborhood of 25 percent similar to that of frozen SURIMI as the raw material, then subjected to preliminary kneading, then to kneading in the presence of sodium chloride and to final kneading. The mix from the final kneading was heated to produce a gel. The gel was cooled and then tested for jelly strength and subjected to a bending test. The results were as shown below.

For the purpose of comparison, the frozen SURIMI raw material was subjected to heat treatment by repeating the procedure described above, except for omission of water addition. The sol consequently obtained was cooled and then tested for jelly strength.

|  | Jelly strength (g) |
|---|---|
| Test specimen obtained by Example 2 | 680 |
| Test specimen obtained from frozen SURIMI | 712 |

The bending test performed by the procedure of Example 1 rated the bending strength as AA grade.

Furthermore, the results tested by the texturometer mentioned in the Example 1 also were as shown below.

|  | Hardness | Elasticity |
|---|---|---|
| Test specimen of Example 2 | 4.58 | 12.0 |
| Test specimen from raw SURIMI | 4.8 | 9.0 |

Comparative Example 100 kg of raw sliced meat of Alaska pollack, which was preserved at a temperature of 5° C. for two days after fishing, was washed with water and then mixed with 5.0 kg of sucrose and 0.2 kg of sodium pyrophosphate. The raw slices of starting material contained 67% by weight of undenatured myofibril proteins and retained 213 to 214 μmol p/min of ATPase activity. The resultant mixture was cooled to a temperature of 5° C. and divided into three portions A, B and C.

Portion A was minced with a silent cutter and then kneaded with a meat chopper, and subsequently the kneaded meat was converted into a sol in a colloid mill at a rate of 2,200 rpm while feeding it in the form of lump little by little thereinto. The meat temperature was kept at a temperature of about 5° C. during the treatment of mincing, kneading and colloid milling. The resulting sol was confirmed to have fine air bubbles of 0.2 to 0.5 mm φ in size uniformly distributed throughout. The thus obtained sol was foamed into a porous mass, and then the obtained porous mass was dried by the same procedures as described in Example 1. The porous mass foamed under vacuum increased by 2.5 to 3 times in volume and held a stable foam having a sponge structure.

Portion B was minced with a silent cutter at a temperature of 5° C. and then was whipped with a Kenwood whipper (a power-operated beater). In the whipping step, it was difficult to have fine air bubbles uniformly distributed in the obtained sol due to the adherence of the sol to the beater and to the inner wall of the hopper of the whipper. As a result, rough air bubbles were observed, having size of more than 10 mm φ in the whipped sol. The thus obtained sol was foamed into a porous mass, and then the obtained porous mass was dried by the same procedures as in the portion A. The rough foams in the porous mass, formed under vacuum, were broken down as the degree of vacuum lowered.

From portion C a dried matter was prepared by the same procedures as in the portion B, then one portion of the thus obtained dried matter was subjected to surface-localized fusing at a temperature of 38° C. for 15 minutes and another portion to the surface-localized fusing at a temperature of 55° C. for 4 minutes, respectively. There could not be observed the effect of surface-sealing in the one treated at a temperature of 38° C. and there was observed only insufficient effect of the surface-sealing in the other treated at a temperatue of 55° C. It was noted that the aforementioned treatment at a temperature of more than 55° C. brought out the denaturation of proteins resulting in essential loss of the functional characteristics of fresh fish meat in the final product. The functional characteristics of each of the fish meat powders prepared from the portion A, B and C as described above were tested by the same procedures as described in Example 1. The results were as shown in the Table below.

Table

|  | Product from A | Product from B | Product from C | |
|---|---|---|---|---|
|  |  |  | treated at 38° C. | treated at 55° C. |
| Remained ATPase activity (μmol p/min/g solid matter) | 185 | 22 | 26 | 20 |
| Jelly strength (g) | 485 | 152 | 183 | 160 |
| Water holding property (g/g) | 39 | 2.0 | 1.8 | 2.2 |
| Emulsifying property (g/g) | 18 | 1.3 | 1.4 | 1.4 |
| Bending test | AA | D | D | D |

Note:
"AA" in Bending test means that several discs of product, 3 cm in diameter and 0.3 cm thick, are able to be folded without any cracks into quadrant "D" in Bending test means that several discs of product, 3 cm in diameter and 0.3 cm thick, are not able to be two folded.

As seen from Table mentioned above, the product from C, which corresponds to a product obtained by the process disclosed in U.S. Pat. No. 3,093,488 (Graham et al), is remarkably inferior to the product from A (the present invention) in the functional characteristics of fresh fish meat. Also, the functional characteristics of the product from B, which corresponds to a product obtained by the Graham et al process provided that the surface-sealing treatment was omitted therein, is inferior to that of the product from A. It should be noted that the jelly strength of product from the portion A in the Comparative Example was lower than those in Examples 1 and 2 due to the fact that fish meat preserved for two days after fishing was used as the starting material.

It should be noted that the above description is directed to a preferred embodiment of the invention and that those skilled in the art will be able to make improvements and modifications which fall within the scope of the appended claims.

We claim:

1. A method of making a fish meat powder retaining the functional characteristics of fresh fish meat which comprises:
   (a) mincing and kneading a fresh raw fish meat at a temperature of not more than 30° C. to yield a product retaining ATPase activity and at least 50% by weight undernatured myofibril proteins;
   (b) forming a fish meat sol having fine air bubbles uniformly distributed therein by subjecting at a temperature of not more than 30° C. said product of step (a) to a colloid mill treatment;
   (c) foaming said fish meat under a vacuum of from 4.6 Torr to 30 Torr whereby there is obtained a porous mass; and
   (d) drying said porous mass at a temperature of not more than 30° C.

2. The method according to claim 1, wherein said mincing and kneading are carried out in the presence of amounts to stabilize said formed air bubbles of a member selected from the group consisting of a soluble polysaccharide, a soluble protein, a natural gum and a synthetic stabilizer.

3. The method according to claim 1, wherein said product of step (a) is fed gradually said colloid mill at a rate sufficient for obtaining a fish meat sol having fine air bubbles uniformly contained therein.

4. The method according to claim 2, wherein said temperature in step a is in the range of from about 0° C. to about 5° C.

5. The method according to claim 2, wherein said polysaccharide includes dextrin.

6. The method according to claim 2, wherein said soluble protein includes whey protein or egg white.

7. The method according to claim 2, wherein said natural gum includes tragacanth gum.

8. The method according to claim 2, wherein said synthetic stabilizer includes carboxymethyl cellulose.

9. A method of claim 1, wherein said fresh uncooked fish meat is fresh raw fish meat or a frozen ground raw fish meat.

10. A method of claim 9, wherein said fresh raw fish meat is uncooked raw fish meat.

11. A method of claim 9, wherein said fresh raw fish meat is a frozen ground raw fish meat.

12. A method of claim 9, wherein said fish meat powder is produced in step (d) in the form of a thin sheet.

* * * * *